(12) United States Patent
Nejabat et al.

(10) Patent No.: US 11,718,251 B2
(45) Date of Patent: Aug. 8, 2023

(54) VEHICLE FRONT STRUCTURE FOR IMPROVED COMPATIBILITY DURING A FRONTAL CRASH

(71) Applicant: Volvo Car Corporation, Gothenburg (SE)

(72) Inventors: Babak Nejabat, Torslanda (SE); Weijia Wu, Gothenburg (SE); Asmer Ibrovic, Gothenburg (SE); Ejder Eken, Gothenburg (SE); Frida Madsen, Gothenburg (SE); Martin Swahn, Halso (SE)

(73) Assignee: VOLVO CAR CORPORATION, Gothenburg (SE)

( * ) Notice: Subject to any disclaimer, the term of this patent is extended or adjusted under 35 U.S.C. 154(b) by 85 days.

(21) Appl. No.: 17/329,975

(22) Filed: May 25, 2021

(65) Prior Publication Data

US 2021/0370859 A1 Dec. 2, 2021

(30) Foreign Application Priority Data

May 27, 2020 (EP) .................................... 20176841

(51) Int. Cl.
*B60R 19/34* (2006.01)
*B60R 19/18* (2006.01)
*B60R 19/26* (2006.01)

(52) U.S. Cl.
CPC .............. *B60R 19/34* (2013.01); *B60R 19/18* (2013.01); *B60R 2019/1806* (2013.01); *B60R 2019/264* (2013.01)

(58) Field of Classification Search
CPC . B60R 19/18; B60R 19/34; B60R 2019/1806; B60R 2019/264
See application file for complete search history.

(56) References Cited

U.S. PATENT DOCUMENTS 5,100,189 A   3/1992 Futamata et al.
8,454,080 B2  6/2013 Qu et al.
(Continued)

FOREIGN PATENT DOCUMENTS

CN      107042843 A     8/2017
DE  10 2016 200 983 A1  7/2017
(Continued)

OTHER PUBLICATIONS

Extended EP Search Report for EP Application No. 20176841.3 dated Jul. 3, 2020, 6 pages.

*Primary Examiner* — Dennis H Redder
*Assistant Examiner* — Melissa Ann Bonifazi
(74) *Attorney, Agent, or Firm* — Amin, Turocy & Watson, LLP (57) ABSTRACT

The present disclosure relates to a Vehicle front structure as defined above is provided, in which the front structure comprises: a side member for supporting a vehicle bumper beam, the side member extending along a longitudinal axis between a first end for connecting to the vehicle bumper beam and a second end for connecting to a bulkhead, and a lateral extension member extending substantially perpendicular with respect to the longitudinal axis of the side member and outward with respect to the vehicle front structure, the lateral extension member is connected to the side member such that the lateral extension member can exert a bending moment to the side member, and a bending strength of the lateral extension member in backward direction towards the side member is higher compared to a bending strength in the forward direction away from the side member.

20 Claims, 6 Drawing Sheets

(56) References Cited

U.S. PATENT DOCUMENTS

| | | |
|---|---|---|
| 9,180,828 B2 | 11/2015 | Sakakibara et al. |
| 10,046,723 B1 | 8/2018 | Faruque et al. |
| 2013/0256051 A1 | 10/2013 | Nakamura et al. |
| 2015/0048650 A1* | 2/2015 | Gupta .................. B62D 29/007 296/187.1 |
| 2015/0314742 A1 | 11/2015 | Kato et al. |
| 2015/0336525 A1 | 11/2015 | Nam et al. |
| 2016/0039373 A1 | 2/2016 | Kamada |
| 2016/0046250 A1 | 2/2016 | Sotoyama |
| 2016/0121934 A1 | 5/2016 | Murayama |
| 2016/0264178 A1 | 9/2016 | Ito et al. |
| 2017/0106909 A1 | 4/2017 | Daido et al. |
| 2017/0113735 A1 | 4/2017 | Kawabe et al. |
| 2017/0210316 A1 | 7/2017 | Duffe |

FOREIGN PATENT DOCUMENTS

| | | |
|---|---|---|
| DE | 10 2017 222 081 A1 | 6/2019 |
| JP | H10203411 A | 8/1998 |
| JP | 2008213739 A | 9/2008 |
| JP | 5776885 B2 | 9/2015 |
| JP | 2015189406 A | 11/2015 |

\* cited by examiner

VEHICLE FRONT STRUCTURE FOR IMPROVED COMPATIBILITY DURING A FRONTAL CRASH

CROSS-REFERENCE TO RELATED APPLICATIONS

This application claims priority to EP patent application no. 20176841.3 filed 27 May 2020, entitled "Vehicle front structure for improved compatibility during a frontal crash." The entirety of the aforementioned application is hereby incorporated herein by reference.

TECHNICAL FIELD

The present disclosure relates to passive safety systems in vehicle front structures of vehicles, in particular passenger vehicles. There is still the need for further development/refinement of passive safety systems. Once an accident occurs, the objective of Passive Safety systems is to mitigate the effects and reduce the risk of injury of the occupants.

BACKGROUND ART

The Passive Safety systems have a deformation zone and safety cage that are defined by the vehicle body front structure. The deformation zone is designed to allow a controlled energy absorption, hence leading to smooth reduction of the vehicle impact velocity. The safety cage, on the other hand, is designed to be as stiff as possible thereby protecting the occupants. The classic dilemma of obtaining a proper balance between these two contradicting aspects has been a great challenge for car manufacturers for a long time. However, during the past decades, using high strength materials in the structure has solved this issue.

This development gives rise to yet another issue concerning interaction with other vehicles. While protecting the vehicle's own occupants, in a car-to-car accident situation, strong vehicle structures can have a harmful effect on the counter-part (partner vehicle). Especially in the case of size difference between the two colliding cars, e.g. an SUV against a small car. This car-to-car issue may be referred to with compatibility and is becoming more important.

A lateral extension member behind the bumper area is known. The function of the known lateral extension member in the art is to shift a car sideways in case of a small overlap crash with a fixed offset rigid barrier at the driver side e.g. a pole. The load case is referred to as "SPOC". However this lateral projection may under circumstances drive a car front wheel towards the passenger compartment which is highly undesirable.

SUMMARY OF THE DISCLOSURE

According to the current disclosure, in order to improve the compatibility in relation to partner vehicles during a crash, widening of the frontal face of the structure is done by a lateral extension member. This will secure proper transfer of loads and moments on to the bend lines of the side members. Optimization of the strength balance between bumper beam, crash box and the side members is essential. This is achieved by the addition of the lateral extension member to extend from the front face in Y-direction, that is a transverse direction.

To integrate the lateral extension member, the front bumper beam is strengthened for improved load distribution and to avoid sudden deflection at the centre of the beam. In addition, the strength balance of the complete bumper system is optimized. Importantly, the lateral extension member is configured such that a bending strength of the lateral extension member in a backward direction towards the side member is higher compared to a bending strength in a forward direction away from the side member. This avoids movement of a front wheel towards the passenger compartment during a frontal crash.

According to the present disclosure, a vehicle front structure as defined above is provided, in which the front structure comprises;
   a side member for supporting a vehicle bumper beam, the side member extending along a longitudinal axis between a first end for connecting to the vehicle bumper beam and a second end for connecting to a bulkhead, and
   a lateral extension member (3) extending substantially perpendicular with respect to the longitudinal axis of the side member and outward with respect to the vehicle front structure,
   the lateral extension member being connected to the side member and the lateral extension member being configured to exert a bending moment to the side member, and a bending strength of the lateral extension member in a backward direction towards the side member being higher compared to a bending strength in a forward direction away from the side member.

The effect of the disclosure is that load to a partner vehicle is evenly distributed during an initial phase of a frontal crash. The more even distribution is possible because the lateral extension member enables dividing the crash load between the bumper and the side member because the later extension member initiates deformation of the side member. During a later phase of the frontal crash, stack up of material in the backward direction is reduced because a bending strength of the lateral extension member in the backward direction towards the side member is higher compared to a bending strength in the forward direction away from the side member. Therefore, the lateral extension member bends away in the forward direction instead of stacking up material.

The present disclosure therefore assures that the damage to a partner vehicle is reduced, while stack up of material in the backward direction, that is towards a passenger compartment is not compromised. This is possible because in the first initial phase of the frontal crash, the bending strength of the lateral extension member in the backward direction towards the side member assures a distribution of the load between the front structure and the partner vehicle as well as an effective transfer of an impact load to the side member. Importantly, during a later phase of the frontal crash, the lower bending strength in the forward direction away from the side member reduces a stack up of material in the backward direction.

The side member is for supporting a vehicle bumper beam. The bumper beam is part of a conventional well known vehicle front structure, in particular a passenger vehicle front structure. The bumper beam connects directly or indirectly to the side member to support the bumper beam.

The extension member is a lateral extension member and extends sideward from the side member. The lateral direction is with respect to a longitudinal axis of a passenger vehicle. Therefore, the lateral extension member increases a width of a surface area as seen from a front, that is as seem from a partner vehicle before a frontal crash.

The lateral extension member is connected to the side beam. The lateral extension member can be connected directly or indirectly to the side beam as long as the lateral extension member can exert a bending moment to the side beam.

In contrast, in the prior art the lateral extension member abuts a pole and contacts a stiff part of the car structure, like the engine or engine support. Therefore, the car is forced sideways away from the pole. It is not known in the prior art that a lateral extension member distributes the crash load and triggers deformation of a side member in general. Configuring a lateral extension member such that a bending strength of the lateral extension member in the backward direction towards the side member is higher compared to a bending strength in the forward direction away from the side member is also not known in the prior art.

In an embodiment of the vehicle front structure, the lateral extension member is connected to the side member at the first end of the side member. The lateral extension member connecting at the first end of the side member to the side member assures that deformation of the entire side member can be initiated by the lateral extension member. The first end of the side member is the end of the side member that faces the bumper beam.

In an embodiment of the vehicle front structure, the vehicle front structure comprises;
 a bumper beam,
 an impact absorbing unit connected to the bumper beam and the first end of the side member, and defining a deformation zone between the bumper beam and the side member for smooth reduction of a vehicle impact velocity,
 a mounting system for mounting the lateral extension member (3) to the impact absorbing unit and/or the first end of the side member, and configured to exert the bending moment to the side member.

The combination of the impact absorbing unit and the lateral side member that initiates deformation of the side member, enables even more to avoid exceeding a collapsing load of the bumper beam. In other words, the bumper beam maintains integrity and form. This contributes even more to the distribution of the load between the front structure and the partner vehicle. The impact absorbing unit is also referred to as a "crash box" because of the, here passive, safety protection it provides to vehicle passengers. The mounting system facilitates that the lateral extension member can exert the bending moment to the side member. In this case, the mounting system is of a modular design. This facilitates focusing the design of the mounting system on its primary function to mount the lateral extension member to the vehicle front structure and exert a bending moment to the side member. In addition, the modular designed mounting system enables minimizing adaptations to the design of the side member and the impact absorbing unit. The bumper beam and impact absorbing unit and here also the lateral extension member, can also be referred as "bumper system".

In an embodiment of the vehicle front structure, the lateral extension member extends further than the bumper beam. This increases an impact surface facing the forward direction and may contribute to the load distribution even more.

In an embodiment of the vehicle front structure, the mounting system connects both to the impact absorbing unit and the side member. This enables to utilize the entire length of the side member as effective length available for deformation and thus absorption of crash energy. The mounting system may connect directly or indirectly, like through a mounting plate, to one or both of the impact absorbing unit and the side member.

In an embodiment of the vehicle front structure, the mounting system is configured for mounting the lateral extension member through both a retaining support and a bearing support. An example of a retaining support is a retaining bolt connection, a form closed connection or a force closed connection. The bearing support is a contact bearing that works in one direction and releases in the direction opposite the one direction.

In an embodiment of the vehicle front structure, the mounting system comprises a cellular structure and comprises at least two cells for accommodating at least a portion of the lateral extension member. This all the more facilitates that the lateral extension member can exert a bending moment to the side beam. The cells can be open to the side for accommodating the at least a portion of the lateral extension member. The cells can be formed of a continuous circumferential cell wall. The two cells for accommodating at least a portion of the lateral extension member can be adjacent cells. Although the mounting system is explained as having a cellular structure, a different structure is conceivable as long as the mounting system is configured for mounting the lateral extension member through both a retaining support and a bearing support.

In an embodiment of the vehicle front structure, the lateral extension member is arranged between the bumper beam and the side member. The lateral extension member is arranged between the bumper beam and the side member as seen in a longitudinal direction of the vehicle.

In an embodiment of the vehicle front structure, the lateral extension member comprises a T-shaped cross section for increasing an impact surface facing the forward direction. The T-shaped cross section effectively increases the impact surface of the lateral extension member in combination with an optimized weight of the lateral extension member.

In an embodiment of the vehicle front structure, the lateral extension member comprises a weakened section for determining a failure load and/or failure mechanism of the lateral extension member. The weakened section all the more facilitates that the bending strength of the lateral extension member in the backward direction towards the side member is higher compared to the bending strength in the forward direction away from the side member. Any suitable weakened section will suffice. For example the weakened section may comprise a through hole.

In an embodiment of the vehicle front structure, the lateral extension member comprises a mounting projection for accommodation in the mounting system, and the mounting projection being coupled to the mounting system through fastening means like a pair of bolts. The mounting projection facilitates connecting the lateral extension member to the side member. The mounting projection is coupled to the mounting system through fastening means like a pair of bolts, that form the retaining support of the mounting system. The mounting projection can be accommodated in a cell of the cellular structure of the mounting system. The bolts may extend vertically to facilitate bending of the lateral extension member in the forward direction away from the side member during the later phase of the frontal crash. This avoids enclosing of material and reduces stack up of the material in the backward direction.

In an embodiment of the vehicle front structure, the lateral extension member comprises a pair of mounting projections, at least one of the pair of mounting projections being accommodated in the mounting system with a sliding fit.

Accommodating at least one of the pair of mounting projections in the mounting system with a sliding fit facilitates bending of the lateral extension member in the forward direction away from the side member even more. The pair of mounting projections may form a forked section facing the mounting system. The at least one of the pair of mounting projections that is accommodated in the mounting system with a sliding fit forms the bearing support of the mounting system.

In an embodiment of the vehicle front structure, the at least one of the pair of mounting projections comprises a bevelled end. This facilitates swivelling of the at least one of the pair of mounting projections out of the mounting system.

In an embodiment of the vehicle front structure, the lateral extension member comprises a stop surface abutting the mounting system for exerting the bending moment to the side member and activating side member deformation.

In an embodiment of the vehicle front structure, the stop surface flanks the at least one of the pair of mounting projections. The stop surface may comprise a pair of stop surfaces at opposite sides of the at least one of the pair of mounting projections.

According to the present disclosure a vehicle is provided, the vehicle comprising a vehicle front structure as defined above. The vehicle can be any type of conceivable vehicle, in particular a passenger vehicle.

According to the present disclosure, a method is provided for retrofitting a lateral extension member as defined above to a vehicle, in particular a vehicle.

According to the present disclosure, a lateral extension member is provided as defined above. The lateral extension member is designed and configured for the vehicle front structure as defined above.

BRIEF DESCRIPTION OF THE DRAWINGS

The present disclosure will be discussed in more detail below, with reference to the attached drawings, in which.

DESCRIPTION OF EMBODIMENTS

Figure 1:
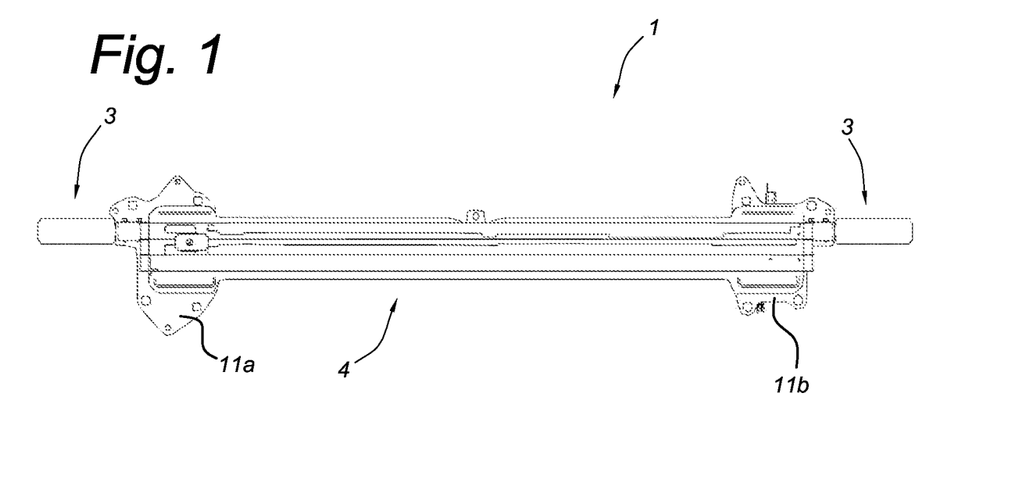
FIG. 1 depicts a front view of a vehicle front structure according to the disclosure.
Figure 2:
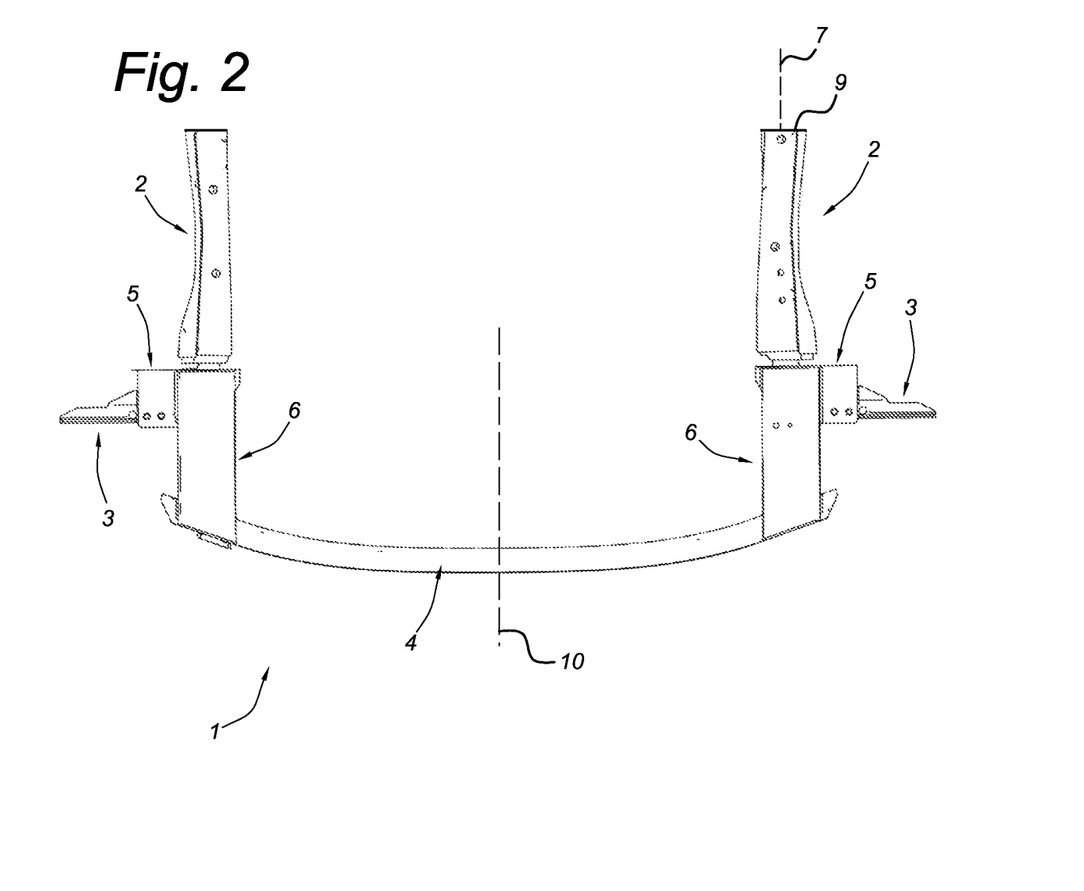
FIG. 2 depicts a top view of the front structure of FIG. 1.

FIG. 1 and FIG. 2 depict an embodiment of a vehicle front structure according to the disclosure. The passenger vehicle front structure 1, comprises a side member 2. In most cases the front structure 1 has symmetry and thus the passenger vehicle front structure 1 comprises two side members 2. The pair of side members 2 are arranged at opposite sides of the front structure 1. The side member extends along a longitudinal axis 7. The side member 2 extends between a first end 8 and a second end 9. The vehicle front structure 1 comprises a bumper beam 4. The first end 8 of the side member 2 connects to the vehicle bumper beam 4. The second end 9 of the side member 2 connects to a bulkhead (not shown). The vehicle bumper beam 4 and side members 2 as well as the impact absorbing units 6 do form part of a passive safety system that determines how well a vehicle performs under crash load conditions. The second end 9 of the side member 2 may connect to any suitable other part of a vehicle structure as long as it is clear that a passive safety system is formed. The side members 2 support the vehicle bumper beam 4. The side member 2, as well as the bumper beam 4 is configured to deform under defined load conditions and will therefore absorb impact energy during a vehicle crash.

The passenger vehicle front structure 1, comprises a lateral extension member 3. Lateral is to say that the extension member 3 extends substantially perpendicular with respect to the longitudinal axis 7 of the side member 2. The extension member 3 extends outward with respect to the vehicle front structure 1. The lateral extension member 3 is arranged between the bumper beam 4 and the side member 2 as seen along the longitudinal axis 10 of vehicle front structure 1. Here, the lateral extension member 3 extends further than the bumper beam 4. The lateral extension member 3 provides an increase of an impact surface. "Impact surface" is the effective surface that can bear a crash load and faces a, in this case forward, direction. The lateral extension member 3 is connected to the side member 2. The lateral extension member 3 is connected to the side member 2 at the first end 8 of the side member 2.

The lateral extension member 3 is connected to the side member 2 such that the lateral extension member 3 can exert a bending moment to the side member 2. The lateral extension member 3 is configured such that a bending strength of the lateral extension member 3 in the backward direction towards the side member 2 is higher compared to a bending strength in the forward direction away from the side member 2.

The passenger vehicle front structure 1 comprises in this case an impact absorbing unit 6. Such an impact absorbing unit 6 is also referred to as a "crash box". The impact absorbing unit 6 is connected to the bumper beam 4 and the first end 8 of the side member 2. Here, the side member 2 is thus indirectly connected to the bumper beam 4. The side member 2 is indirectly connected to the bumper beam 4 through the impact absorbing unit 6. The side member 2 is indirectly connected to the bumper beam 4 via the impact absorbing unit 6. The impact absorbing unit 6 is a part that is designed and configured to define a deformation zone between the bumper beam 4 and the side member 2. The impact absorbing unit 6 importantly contributes to a smooth reduction of a vehicle impact velocity.

The passenger vehicle front structure 1 comprises a mounting system 5 for mounting the lateral extension member 3 to the vehicle front structure 1. In this case, the mounting system 5 connects the lateral extension member 3 to the impact absorbing unit 6. The effect thereof is that the later extension member can initiate deformation of the side member independently of a crash load to the bumper beam 4. This is beneficial in some crash load cases and provides the ability to balance deformation between the bumper beam 4, the impact absorbing unit 6 and the side member 2. Here, the mounting system 5 connects indirectly to the side member 2 through a mounting plate 11a, 11b.

As alternative to the embodiment shown in FIGS. 1 and 2 it is conceivable that the mounting system 5 connects directly to the first end 8 of the side member 2. This may however reduce an effective length of the side member 2 for deformation initiated by the lateral extension member 3. Here, "effective length" is the length available for deformation. It is also conceivable that the mounting system 5 connects both to the impact absorbing unit 6 and the first end 8 of the side member 2.

The deformed vehicle front structure 1 according to the disclosure will now be described under reference to FIGS. 3, 4 and 5.

Figure 3:
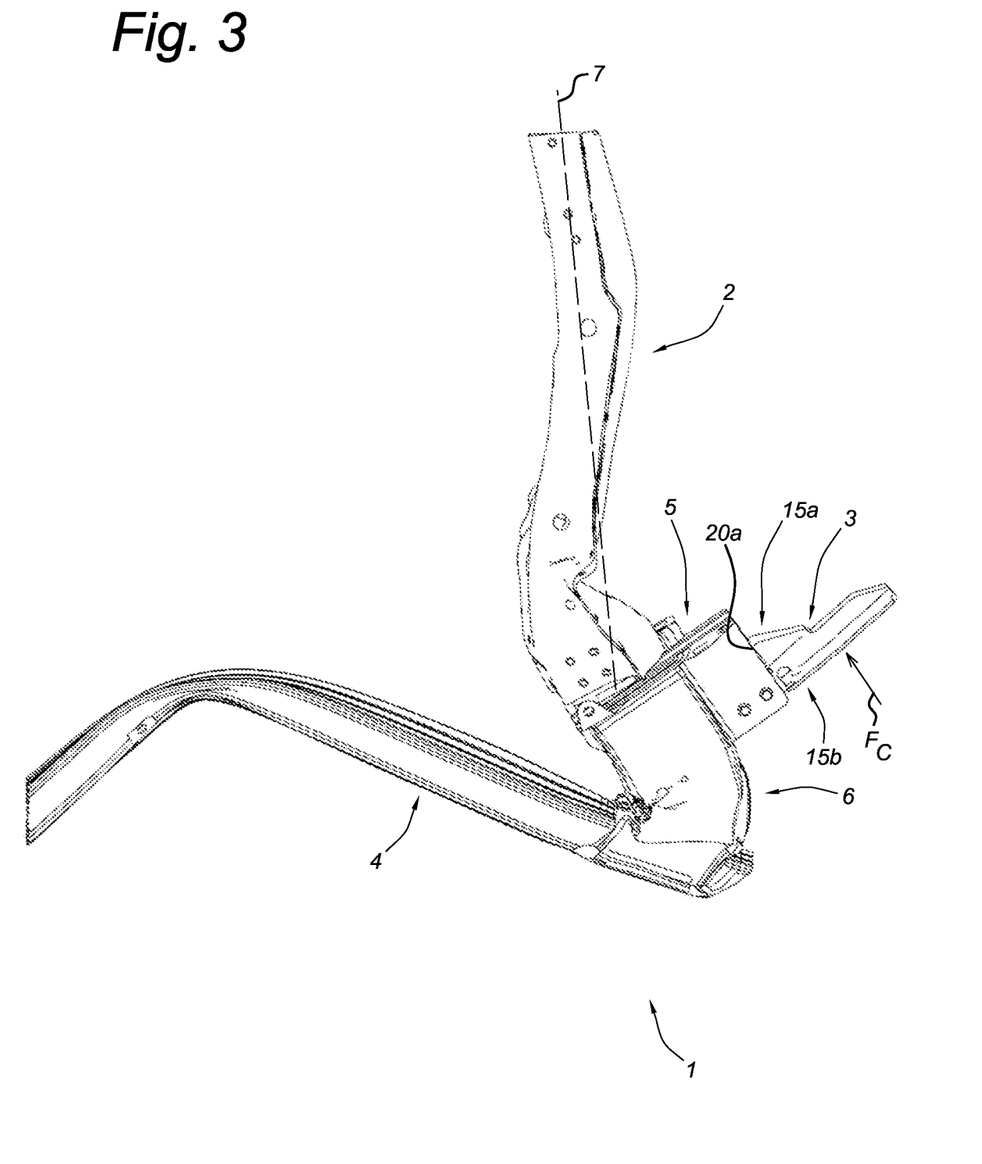
FIG. 3 depicts a part of the front structure of FIGS. 1 and 2 in an initial phase of a frontal crash.

FIG. 3 depicts a part of the front structure of FIGS. 1 and 2 in an initial phase of a frontal crash. In this initial phase of a frontal crash, the lateral extension member 3 is still in its initial engagement with the mounting system 5. The extension member 3 is coupled to the mounting system 5 through both a retaining support and a bearing support as will be explained below. This connection facilitates exertion of a bending moment to the side member 2. As indicated, a crash load Fc has been exerted to the lateral extension member 3. As a consequence, the lateral extension member 3 has initiated deformation of the side member 2. The deformation of the side member 3 includes buckling and bending in this case. The severe crash has also deformed the bumper beam 4 as well as the impact absorbing unit 6. As a result the impact energy has been distributed between the side member 3, the bumper beam 4 as well as the impact absorbing unit 6.

Figure 4:
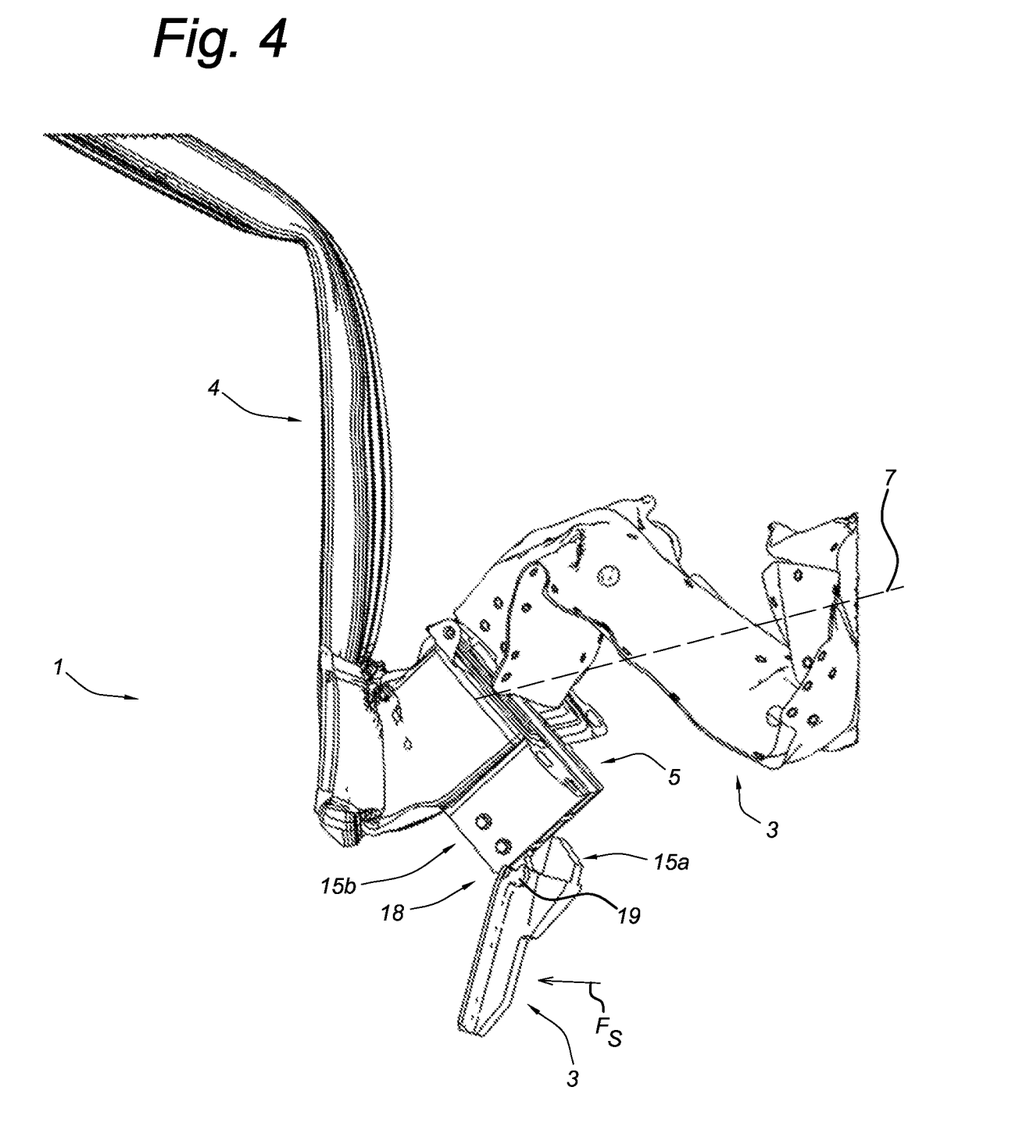
FIG. 4 depicts a detail of the front structure in a later phase of the frontal crash.

FIG. 4 depicts a detail of the front structure in a later phase of the frontal crash. In this later phase of the frontal crash, the lateral extension member 3 is out of its initial engagement with the mounting system 5. The lateral extension member 3 is bent forward with respect to the mounting system 5. The lateral extension member 3 is partly out of contact with the mounting system 5. The extension member 3 is now coupled to the mounting system 5 through a retaining support while the bearing support is out of contact. As indicated, the bending forward of the extension member 3 is caused by a secondary force Fs that is exerted to the lateral extension member 3. This load Fs is or can be exerted by a wheel structure (not shown). This load is called secondary force here because it can be regarded as an internal force as a response to the crash load. The deformation of the side member 3 has progressed and includes even more buckling and bending in this case. Likewise, the bumper beam 4 as well as the impact absorbing unit 6 have progressively been deformed. As a result the impact energy has been distributed between the side member 3, the bumper beam 4 as well as the impact absorbing unit 6, whereas at the same time, stack up of material in the backward direction is reduced. The backward direction is from the vehicle front structure 1 to a vehicle passenger compartment (not shown).

Figure 5:
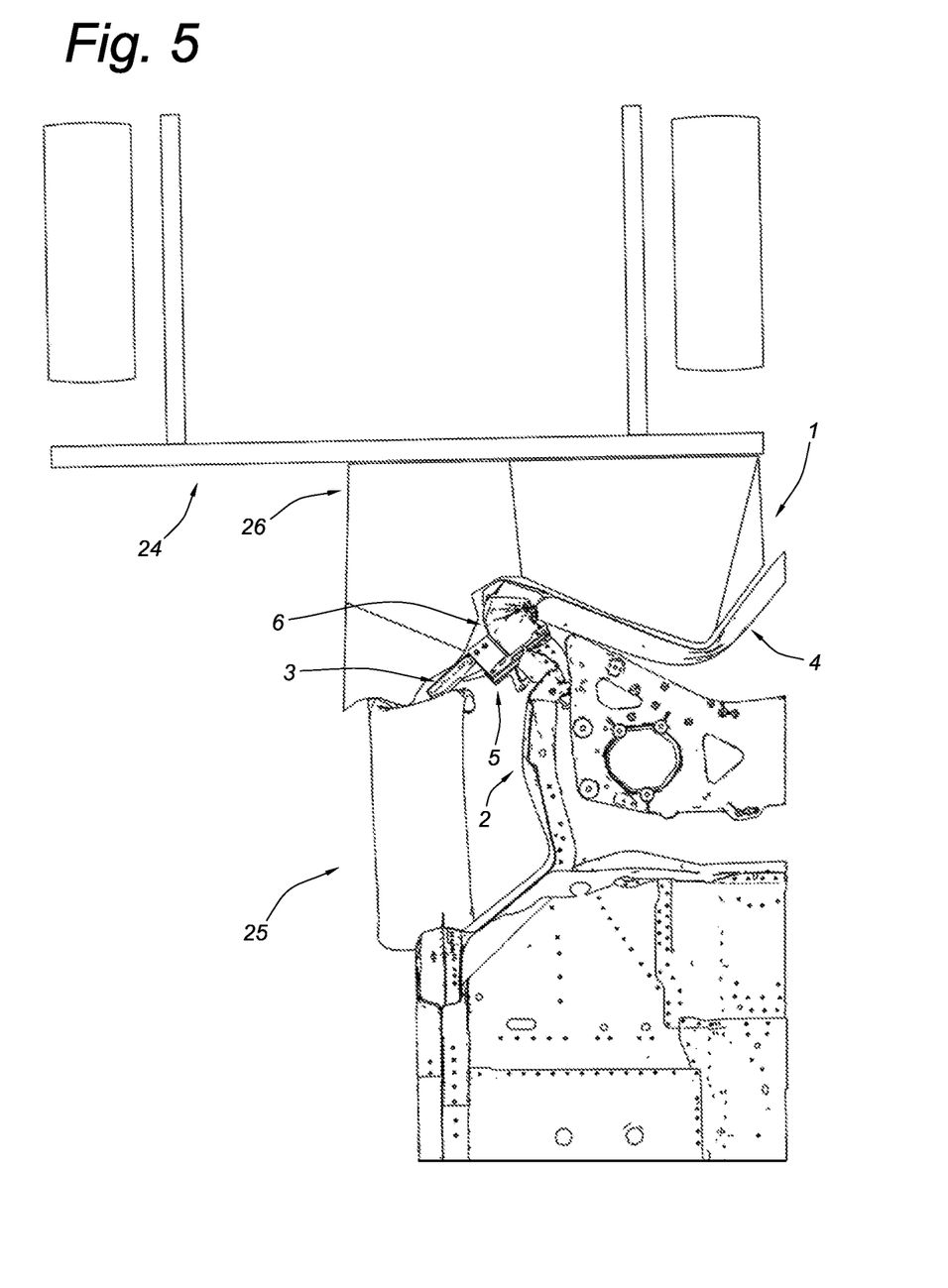
FIG. 5 depicts a schematic top view of a phase during a crash test.

FIG. 5 depicts a schematic top view of a certain phase during a crash test. As general info: The EU-NCAP, the European New CAR Assessment Program, has developed a new frontal offset method to rate the crash performance and crash compatibility against other cars. The new test, MPDB (Moving Progressive Deformable Barrier), consists of a moving progressively deformable barrier 26. According to this new method, the deformation of the barrier 26 is measured and rated. An evenly distributed impression is promoted and results in higher rating. This adds to the complexity when designing the front structure of cars. As explained above, the effect of the current disclosure is that load to a partner vehicle 24 is evenly distributed during an initial phase of a frontal crash. The more even distribution of the crash load over the deformable barrier 26 is possible because the lateral extension member 3 enables dividing the crash load between the bumper beam 4 and the side member 2 because the later extension member initiates deformation of the side member 2. In this case, a portion of the crash load is also directed towards the impact absorbing unit 6. As shown, here the lateral extension member 3 is still in its initial engagement with the mounting system 5. However, the wheel structure 25 just contacts the lateral extension member 3 and soon will exert the secondary force Fs to the lateral extension member 3.

Figure 6:
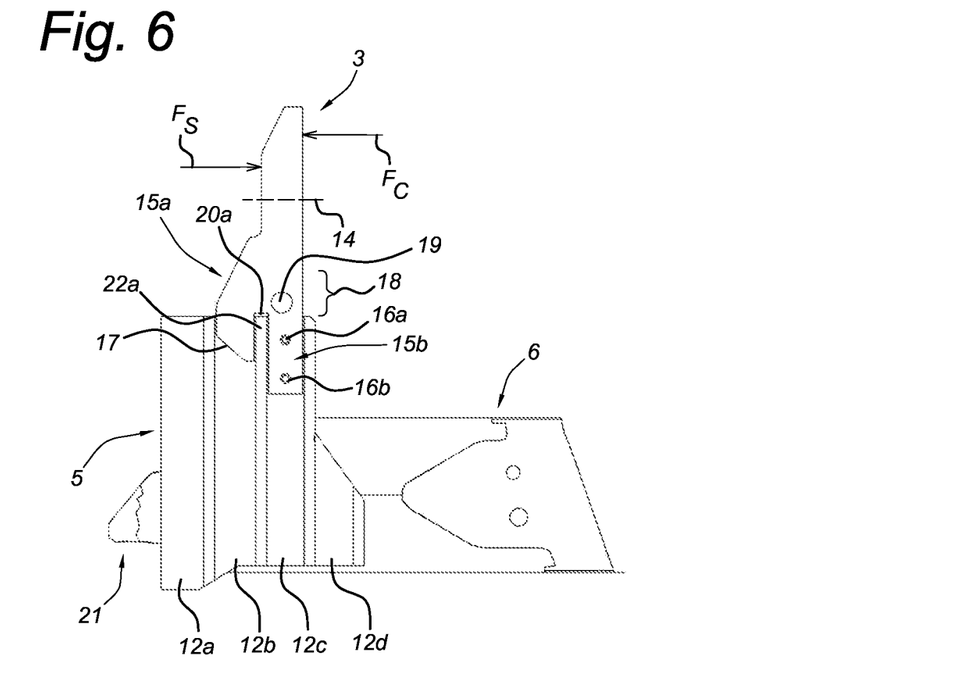
FIG. 6 shows a lateral extension member in different load conditions.
Figure 7:
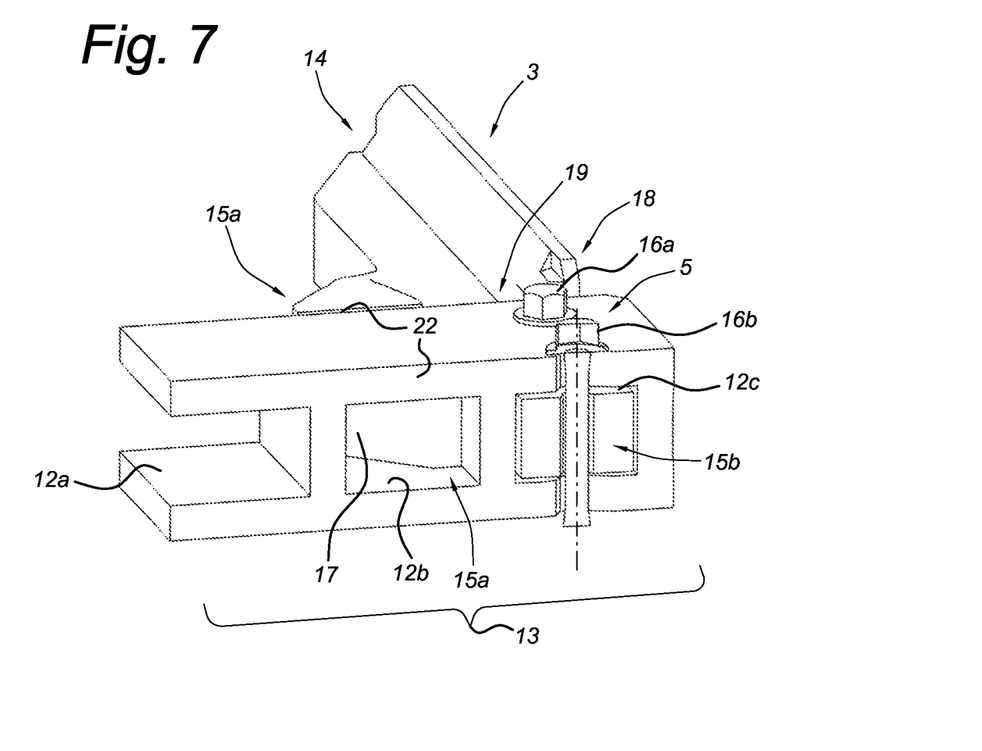
FIG. 7 depicts a cross sectional perspective view of an extension member and mounting system.
Figure 8:
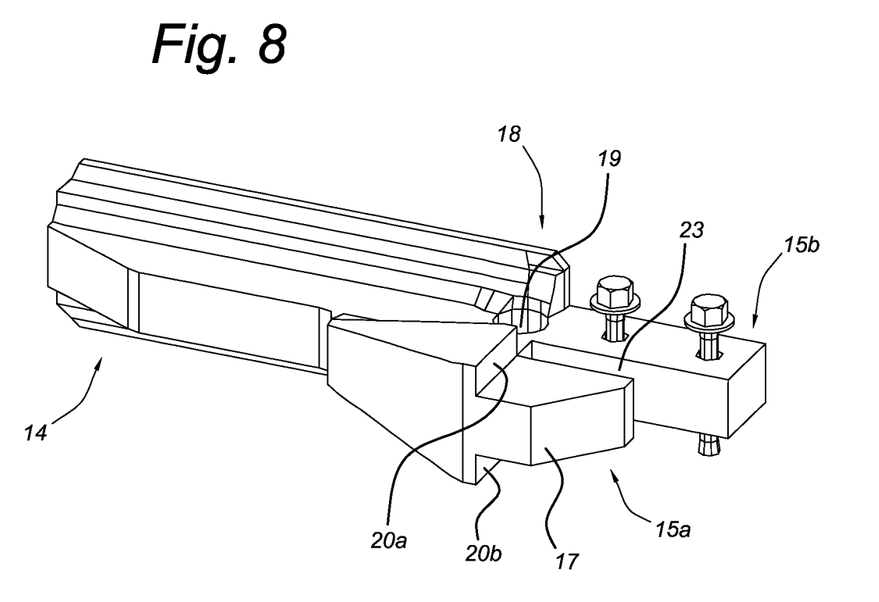
FIG. 8 depicts a cross sectional perspective view of an extension member.

The lateral extension member 3 and its mounting system is now described in more detail referring to FIGS. 6, 7 and 8.

The lateral extension member (3) comprises a T-shaped cross section 14. The T-shaped cross section 14 results in an increase of the impact surface facing the forward direction that is towards a partner vehicle in a frontal crash situation. The lateral extension member 3 comprises a mounting projection 15*a*, 15*b*. The mounting projection 15*a*, 15*b* connects the lateral extension member 3 to the mounting system 5. The lateral extension member 3 comprises a weakened section 18. The weakened section is arranged between the T-shaped cross section 14 and the mounting projection 15*a*, 15*b*. The weakened section 18 determines a failure load and/or failure mechanism of the lateral extension member 3. Here, the weakened section 18 comprises a through hole 19. The through hole 19 facilitates deformation of even rupture of the later extension member 3.

The lateral extension member 3 comprises a pair of mounting projections 15*a*, 15*b* in this case. The pair of mounting projections 15*a*, 15*b* form a forked section facing the mounting system 5. Here, both the mounting projections 15*a*, 15*b* are accommodated in the mounting system 5. The forward mounting projection 15*b* is coupled to the mounting system through a fastening means, here a pair of retaining bolts 16*a*, and 16*b*. Thus the forward mounting projection 15*b* is coupled to the mounting system 5 through a retaining support. The forward mounting projection 15*b* that is retained with the mounting system 5, comprises the weakened section 18. The backward mounting projection 15*a* is accommodated in the mounting system 5 with a sliding fit. The sliding fit facilitates that the backward mounting projection 15*a* can slide out of contact with the mounting system 5. The backward mounting projection 15*a* comprises a bevelled end 17. The bevelled end 17 facilitates even more swivelling of the backward mounting projection 15*a* out of the mounting system 5.

FIG. 7 depicts a cross sectional perspective view of the extension member 3 and the mounting system 5. In this case, the mounting system 5 comprises a cellular structure 13 that provides strength at a low weight. The cellular structure 13 has three cells 12*a*, 12*b*, and 12*c*. These cells 12*a*, 12*b*, 12*c* can have a closed continuous wall 22. It is possible to have a different number of cells like shown in FIG. 6 that adds a fourth cell 12*d*. The cellular structure 13 accommodates a portion of the lateral extension member 3. Here, both the mounting projections 15*a*, 15*b* are accommodated in the mounting system 5. Each of the both mounting projections 15*a*, 15*b* is accommodated in a respective cell 12*b*, 12*c* of the cellular structure 13 of the mounting system 5. A cell wall section 22*a* is accommodated in an empty space 23 between the mounting projections 15*a*, 15*b*. The backward mounting projection 15*a* is accommodated in the mounting system 5 with a sliding fit. The backward mounting projection 15*a* is in bearing contact with the mounting system 5. Thus the backward mounting projection 15*a* is coupled to the mounting system 5 through a bearing support. The backward mounting projection 15*a* is in bearing contact with the mounting system 5 through a stop surface 20*a* of the lateral extension member 3. The stop surface 20*a* contacts the cell wall 22 of the mounting system 5. In this case a pair of stop surfaces 20*a*, 20*b* flank the backward mounting projection 15a and both contact the cell wall 22 of the mounting system 5. Thus the extension member 3 is coupled to the mounting system 5 through both a retaining support and a bearing support. The retaining support comprises the weakened section 18.

As can be best seen in FIG. 8, the lateral extension member 3 comprises the stop surface 20a. Here, the lateral extension member 3 comprises a pair of stop surfaces 20a, 20b. The pair of stop surfaces 20a, 20b are arranged at opposite sides of the lateral extension member 3. The pair of stop surfaces 20a, 20b flank the backward mounting projection 15a. The pair of stop surfaces 20a, 20b abut the mounting system 5 for exerting the bending moment to the side member 2 and activating side member deformation.

The invention claimed is:

1. Vehicle front structure, comprising:
a side member for supporting a bumper beam, wherein the side member extends along a longitudinal axis between a first end of the side member for connecting to the bumper beam and a second end of the side member for connecting to a bulkhead; and
a lateral extension member extending substantially perpendicular with respect to the longitudinal axis of the side member, and outward with respect to the vehicle front structure, wherein the lateral extension member is connected to the side member, and wherein the lateral extension member is configured to exert a bending moment to the side member, and wherein a first bending strength of the lateral extension member in a backward direction towards the side member is higher compared to a second bending strength in a forward direction away from the side member, and wherein the lateral extension member comprises a T-shaped cross section for increasing an impact surface facing the forward direction.

2. The vehicle front structure of claim 1, wherein the lateral extension member is connected to the side member at the first end of the side member.

3. The vehicle front structure of claim 1, wherein the vehicle front structure further comprises:
the bumper beam;
an impact absorbing unit connected to the bumper beam and the first end of the side member, and defining a deformation zone between the bumper beam and the side member for smooth reduction of a vehicle impact velocity; and
a mounting system for mounting the lateral extension member to at least one of the impact absorbing unit or the first end of the side member, and configured to exert the bending moment to the side member.

4. The vehicle front structure of claim 3, wherein the lateral extension member extends further than the bumper beam for increasing the impact surface facing the forward direction.

5. The vehicle front structure of claim 3, wherein the mounting system is connected to the impact absorbing unit and the first end of the side member.

6. The vehicle front structure of claim 3, wherein the mounting system is configured for mounting the lateral extension member through a retaining support and a bearing support.

7. The vehicle front structure of claim 3, wherein the mounting system comprises a cellular structure and at least two cells for accommodating at least a portion of the lateral extension member.

8. The vehicle front structure of claim 3, wherein the lateral extension member is arranged between the bumper beam and the side member.

9. The vehicle front structure of claim 1, wherein the lateral extension member further comprises a weakened section for determining at least one of a failure load or failure mechanism of the lateral extension member.

10. The vehicle front structure of claim 9, wherein the weakened section comprises a through hole.

11. The vehicle front structure of claim 3, wherein the lateral extension member comprises a mounting projection for accommodating in the mounting system, and the mounting projection is coupled to the mounting system via a fastening structure via a pair of bolts.

12. The vehicle front structure of claim 11, wherein the lateral extension member further comprises a pair of mounting projections, and at least one mounting projection of the pair of mounting projections is accommodated in the mounting system with a sliding fit.

13. The vehicle front structure of claim 11, wherein the lateral extension member further comprises a pair of mounting projections, and at least one mounting projection of the pair of mounting projections comprises a beveled end for facilitating swiveling of the at least one mounting projection of the pair of mounting projections out of the mounting system.

14. The vehicle front structure of claim 3, wherein the lateral extension member further comprises a stop surface abutting the mounting system for exerting the bending moment to the side member and activating side member deformation.

15. A front structure for a vehicle, comprising:
a bumper beam;
a side member for supporting the bumper beam, wherein the side member extends along a longitudinal axis between a first end of the side member for connecting to the bumper beam and a second end of the side member for connecting to a bulkhead;
a lateral extension member extending substantially perpendicular with respect to the longitudinal axis of the side member, and outward with respect to the front structure, wherein the lateral extension member is connected to the side member, and wherein the lateral extension member is configured to exert a bending moment to the side member, and wherein a first bending strength of the lateral extension member in a backward direction towards the side member is higher compared to a second bending strength in a forward direction away from the side member;
an impact absorbing unit connected to the bumper beam and the first end of the side member, and defining a deformation zone between the bumper beam and the side member for smooth reduction of a vehicle impact velocity; and
a mounting system for mounting the lateral extension member to at least one of the impact absorbing unit or the first end of the side member, and configured to exert the bending moment to the side member, wherein the mounting system is connected to the impact absorbing unit and the first end of the side member.

16. The front structure of claim 15, wherein the mounting system is configured for mounting the lateral extension member through a retaining support and a bearing support.

17. The front structure of claim 15, wherein the mounting system comprises a cellular structure and at least two cells for accommodating at least a portion of the lateral extension member.

18. The front structure of claim 15, wherein the lateral extension member is arranged between the bumper beam and the side member.

19. The front structure of claim 15, wherein the lateral extension member further comprises a weakened section for determining at least one of a failure load or failure mechanism of the lateral extension member.

20. A vehicle safety system, comprising:
- a bumper beam;
- a side member for supporting the bumper beam, wherein the side member extends along a longitudinal axis between a first end of the side member for connecting to the bumper beam and a second end of the side member for connecting to a bulkhead;
- a lateral extension member extending substantially perpendicular with respect to the longitudinal axis of the side member, and outward with respect to a front structure of the vehicle safety system, wherein the lateral extension member is connected to the side member, and wherein the lateral extension member is configured to exert a bending moment to the side member, and wherein a first bending strength of the lateral extension member in a backward direction towards the side member is higher compared to a second bending strength in a forward direction away from the side member;
- an impact absorbing unit connected to the bumper beam and the first end of the side member, and defining a deformation zone between the bumper beam and the side member for smooth reduction of a vehicle impact velocity; and
- a mounting system for mounting the lateral extension member to at least one of the impact absorbing unit or the first end of the side member, and configured to exert the bending moment to the side member,
- wherein the lateral extension member further comprises a pair of mounting projections, and at least one mounting projection of the pair of mounting projections comprises a beveled end for facilitating swiveling of the at least one mounting projection of the pair of mounting projections out of the mounting system.

* * * * *